(12) United States Patent
Jackson (10) Patent No.: US 8,135,807 B2
(45) Date of Patent: Mar. 13, 2012

(54) PACKET GENERATOR FOR A COMMUNICATION NETWORK

(75) Inventor: Timothy Edward Jackson, Arlington, WA (US)

(73) Assignee: The Boeing Company, Chicago, IL (US)

( * ) Notice: Subject to any disclaimer, the term of this patent is extended or adjusted under 35 U.S.C. 154(b) by 675 days.

(21) Appl. No.: 11/857,155

(22) Filed: Sep. 18, 2007

(65) Prior Publication Data

US 2009/0073984 A1 Mar. 19, 2009

(51) Int. Cl.
*G06F 15/16* (2006.01)
*G06F 15/177* (2006.01)

(52) U.S. Cl. .......... 709/220; 709/223; 709/224

(58) Field of Classification Search .......... 709/220, 709/223, 224; 714/724
See application file for complete search history.

(56) References Cited

U.S. PATENT DOCUMENTS

| | | | | |
|---|---|---|---|---|
| 5,822,520 A * | 10/1998 | Parker | ............. | 709/230 |
| 5,838,919 A * | 11/1998 | Schwaller et al. | ............. | 709/224 |
| 5,881,237 A * | 3/1999 | Schwaller et al. | ............. | 709/224 |
| 6,158,031 A * | 12/2000 | Mack et al. | ............. | 714/724 |
| 6,347,340 B1 * | 2/2002 | Coelho et al. | ............. | 709/246 |
| 6,549,882 B1 * | 4/2003 | Chen et al. | ............. | 703/21 |
| 6,915,344 B1 * | 7/2005 | Rowe et al. | ............. | 709/224 |
| 6,920,410 B2 * | 7/2005 | Southam et al. | ............. | 702/122 |
| 7,020,573 B2 * | 3/2006 | Wheeler et al. | ............. | 702/121 |
| 7,020,797 B2 * | 3/2006 | Patil | ............. | 714/4 |
| 7,159,021 B2 * | 1/2007 | Boldman et al. | ............. | 709/223 |
| 7,581,002 B2 * | 8/2009 | Royalty | ............. | 709/224 |
| 2003/0033406 A1 * | 2/2003 | John et al. | ............. | 709/224 |
| 2005/0010661 A1 * | 1/2005 | Southam et al. | ............. | 709/224 |
| 2007/0162548 A1 * | 7/2007 | Bilkhu et al. | ............. | 709/206 |
| 2008/0086554 A1 * | 4/2008 | Royalty | ............. | 709/224 |

OTHER PUBLICATIONS

Bissone et al., "Switched Ethernet Testing for Avionics Applications", Jun. 1, 2004, Aerospace and Electronic Systems Maganize IEEE, vol. 19 Issue 5, p. 31-35, ISSN: 0885-8985.*

* cited by examiner

*Primary Examiner* — David Lazaro
*Assistant Examiner* — Edward Kim
(74) *Attorney, Agent, or Firm* — Haynes and Boone, LLP (57) ABSTRACT

The present disclosure provides systems and methods for distributing data packets on an aircraft data network having a plurality of end systems. The systems and methods include retrieving a configuration module, retrieving a payload description module, selecting a network interface component, selecting a port rate for the network interface component, selecting a payload module, generating payload data, generating a data packet from the generated payload data, and transmitting the generated data packet to at least one of the plurality of end systems via the network interface component and the aircraft data network.

16 Claims, 10 Drawing Sheets

PACKET GENERATOR FOR A COMMUNICATION NETWORK

TECHNICAL FIELD

The present disclosure relates generally to communication networks and, in particular, to aircraft data networks.

BACKGROUND

Avionics generally refers to aviation electronics, which includes electronic systems for use on an aircraft, such as aircraft communication systems. One such aircraft communication system includes an Aircraft Data Network (ADN), which refers to data networking in commercial and military aircraft installations. The ADN may include network devices, such as bridges, switches, and routers, for network topology in an aircraft environment and may utilize Ethernet technology for data transfer between network devices and systems. In general, Ethernet technology is a packet-based computer networking protocol for local area networks, such as the ADN.

Conventional ADN systems are difficult to test. As a result, there is a need for an improved testing mechanism and process.

SUMMARY

As described herein, embodiments of the present invention provide systems and methods for generating static and sequences of static payloads that are packaged into Ethernet packets and then transmitting the generated Ethernet packets on a data network at a defined interval. The data network may comprise an aircraft data network (ADN).

In accordance with one embodiment, systems and methods described herein provide for distributing data packets to one or more end systems of an ADN. The systems and methods utilize a configuration module, a payload description module, a storage component adapted to store the configuration module and the payload description module, a processor adapted to execute instructions, a network interface component adapted to communicate with the plurality of end systems via the aircraft data network and a user interface component adapted to interact with the processor to retrieve the configuration module and the payload description module from the storage component, generate a data packet for distribution to the plurality of end systems, and communicate with the network interface component to transmit the generated data packet to the plurality of end systems via the aircraft data network.

In accordance with one embodiment, the systems and methods described herein retrieve a configuration module, retrieve a payload description module, select a network interface component, select a port rate for the network interface component, select a payload module, generate payload data, generate a data packet from the generated payload data, and transmit the generated data packet to at least one of the plurality of end systems via the network interface component and the aircraft data network.

In accordance with one embodiment, the systems and methods described herein provide a user interface to bind a data payload to an Ethernet packet for periodic transmission on a physical Ethernet. The systems and methods import two separate eXtensible Markup Language (XML) based files, one for payload description and another for configuring the Ethernet packet.

In accordance with an embodiment, the systems and methods described herein allow a user to identify and select a network interface component and data rate (e.g., 100 Mbps or 10 Mbps, full-duplex) for the component, browse a storage component for an end system configuration XML file, browse the storage component for a data payload description XML file, and then generate a packet.

In accordance with an embodiment, the systems and methods described herein allow a user to generate multiple end system traffic on one or more network interfaces. The payloads are static payloads and sequences of static payloads. One payload definition may be bound to one or more virtual link (VL) and User Datagram Protocol (UDP) port pairs. In some implementations, a virtual link and destination UDP define a unique message. For example, the xml element may include attributes for describing the pairs:

<Message VirtualLink="106" DstUDP="59" TxPortRate="1000000"/>

In accordance with another embodiment, the sequences of static payloads means that one or more instances of a payload may be defined in sequence to be transmitted in round robin sequence. The payload message definition provides the ability to set transmit intervals between each message transmission.

In various embodiments of the present invention, the systems and methods discussed herein may be used to test the data network and end systems in communication therewith. For example, a particular end system may require a periodic heartbeat or keep-alive message with a particular bit pattern at a defined interval, such as every 1000 ms. The tool can be used to simulate the source of the message. This is useful in cases where the real source is an expensive aircraft LRU, such as an engine controller.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

Figure 1A:
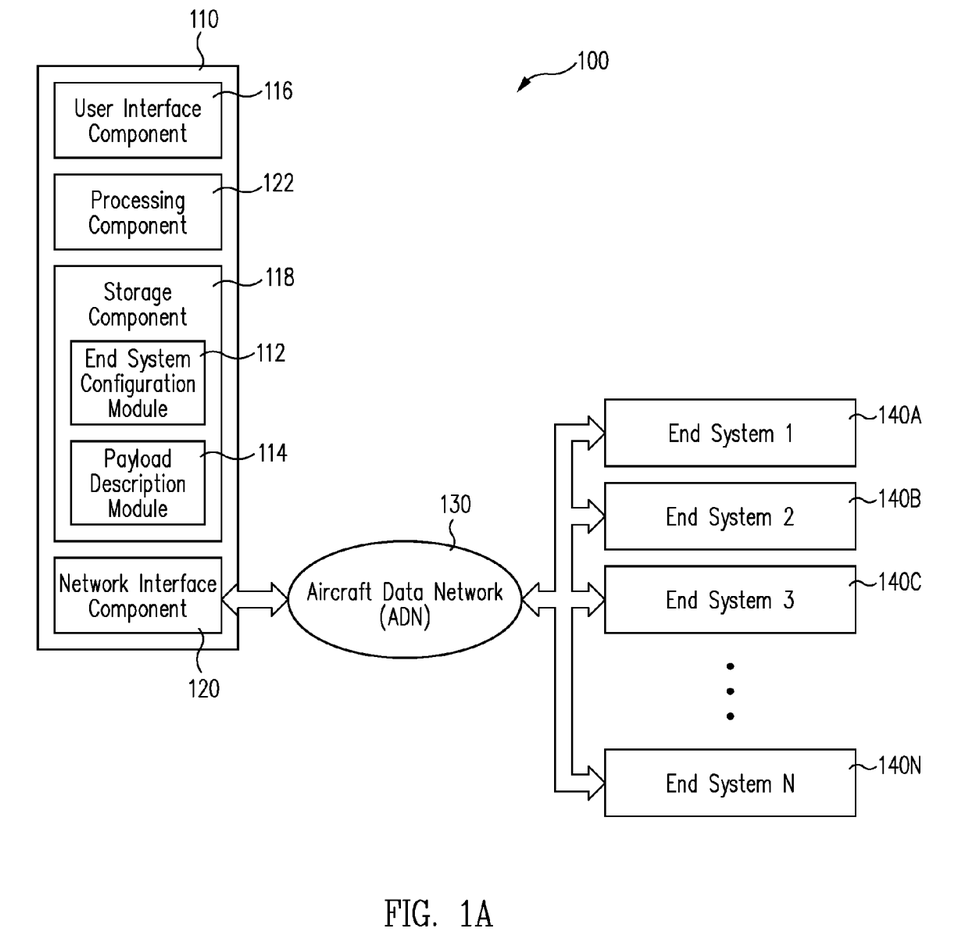
FIGS. 1A-1B show various embodiments of a network communication system.
Figure 1B:
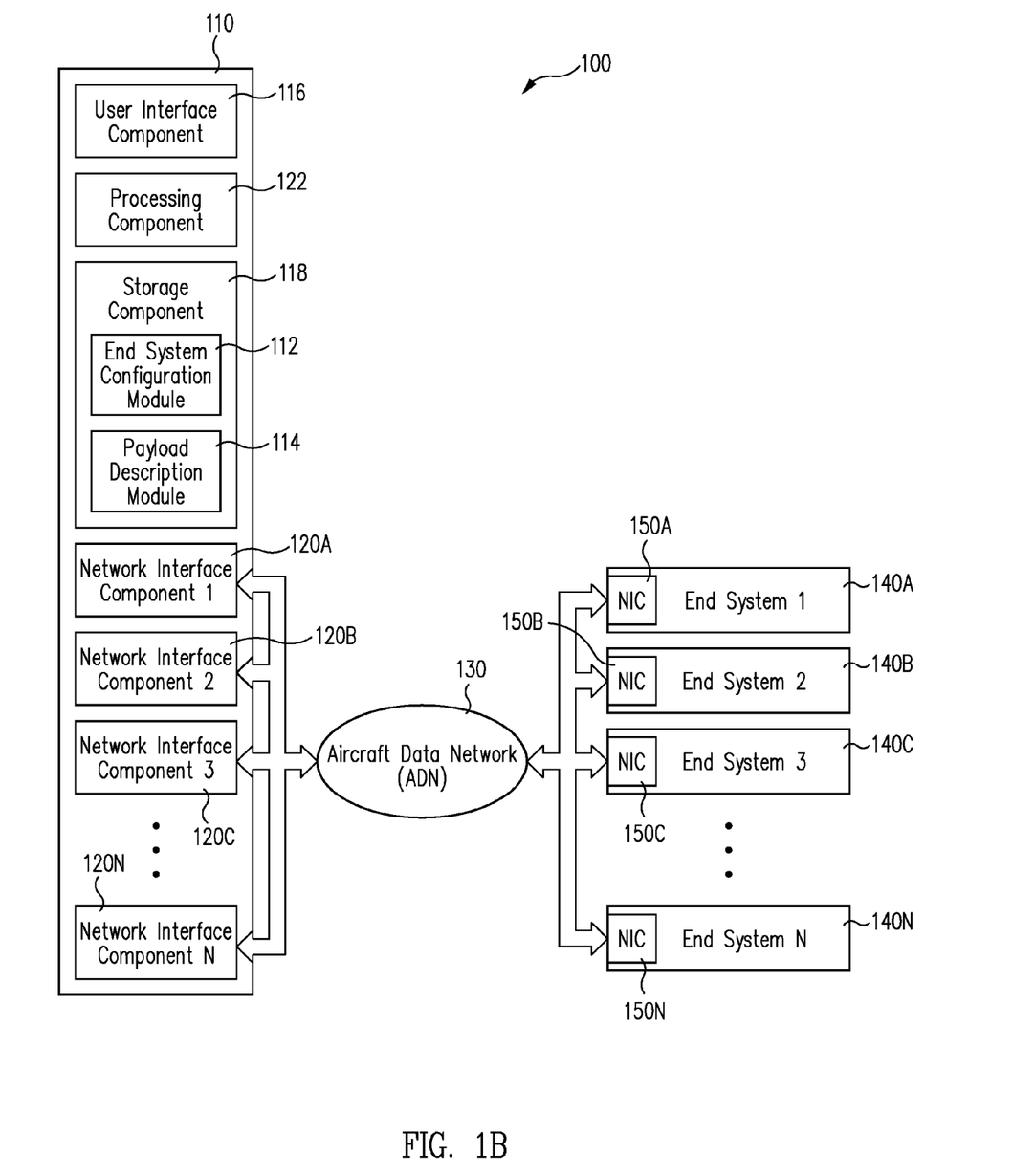

FIGS. 1A and 1B show various embodiments of a network communication system 100 for an aircraft. As shown in FIGS.

1A and 1B, the system 100 comprises a user network device 110, an aircraft data network (ADN) 130 and a plurality of end systems 140A-140N.

In one embodiment, referring to FIG. 1A, the user network device 110 may be configured to comprise a single network interface component 120 adapted to communicate with one or more end systems 140A-140N via ADN 130. In another embodiment, referring to FIG. 1B, the user network device 110 may be configured to comprise a plurality of network interface components 120A-120N adapted to communicate with one or more network interface components (NICs) 150A-150N of the one or more end systems 140A-140N via ADN 130. In one implementation, the ADN 130 may be referred to as a common data network (CDN), which is a term assigned to the generally known Boeing 787 A664 compliant network.

In one embodiment, the user network device 110 comprises an end system configuration module 112, a payload description module 114, a user interface component 116, a storage component 118, one or more network interface components 120, 120A-120N, and a processing component 122. As shown in FIGS. 1A-1B, the end system configuration module 112 and the payload description module 114 may be stored on the storage component 118. As will be discussed herein, the user interface component 116 is adapted to interact with the processing component 122 to retrieve the end system configuration module 112 and the payload description module 114 from the storage component 118 and generate one or more data packets for transmission on the ADN 130 via the network interface component 120. In various implementations, end system may refer to a packet engine used to provide a layer 1, 2, and sometimes 3 medium of the OSI (Open Systems Interconnection) stack.

In one embodiment, the end system configuration module 112 comprises an XML end system configuration file that is user selectable via the user interface component 116. The end system configuration file comprises a hierarchical XML description where one-to-many end systems may be defined. The elements of an end system may be modeled similar to the Aeronautical Radio, Inc (ARINC) specification 664 part 7 definition, titled "Aircraft Data Network Part 7 Avionics Full Duplex Switched Ethernet (AFDX) Network", provided by the Airline Electronics Engineering Committee (AEEC) and referred to herein as ARINC 664P7, published Jun. 27, 2005, which is incorporated by reference in its entirety herein. Each end system has an assigned equipment class and equipment position, which are configured to embed into the source MAC (Media Access Control) address and source IP (Internet Protocol) address. An end system may transmit and receive virtual links. As will be discussed in greater detail herein, the Virtual Link (VL) is an unsigned 16-bit word embedded into the destination MAC address in the Ethernet at octet offset four and five. The virtual link is used by the ARINC 664P7 compliant switch to route the packet per a defined routing table. The Destination User Datagram Protocol (UDP) port is used in conjunction to the VL by the receiving end system to link an application receive port to a network message.

In one embodiment, the end system configuration file may define the equipment class, position, transmit virtual links (VL), sub VLs, transmit ports, receive VLs, receive ports, time manager subscriber data, and error detection encoding information for the one or more end systems 140A-140N in the network communication system 100. The end system configuration module 112 may comprise a module or file selected from a plurality of end system configuration modules or files stored on the storage component 118.

In one embodiment, the payload description module 114 comprises an XML payload description file that is user selectable via the user interface component 116. The payload description file includes at least one payload definition, and the at least one payload definition may be bound to one or more virtual link (VL) and UDP port pairs. The payload description module 114 may comprise a module or file selected from a plurality of payload description modules or files stored on the storage component 118.

In general, XML comprises a general-purpose programming language that allows user defined tags. XML facilitates the sharing of data across different information systems, such as communication networks. In one aspect, a markup language combines text and meta-information about the text. The meta-information describes the structure and/or presentation or the text, which is expressed using markup and is intermingled with the primary text. In general, a tag comprises a relevant term or keyword associated with particular information for describing an item and enabling keyword-based classification of information related to the item. Tags are used for resources, such as computer files. In some instances, an item may have one or more tags associated therewith.

In one embodiment, the user interface component 116 comprises a graphical user interface (GUI) adapted for generating static and sequences of static payload packets. In one implementation, the user interface component 116 utilizes a software application to generate static and sequences of static payload packets for transmission on ADN 130. For example, the user interface component 116 is configured to open a payload description file, bind payloads to packets, and generate the packets with the port rate and payload message content described in the payload description file. In another implementation, enhancements to the GUI may include creation and modification tools for both the End System XML and the Payload Description XML files, wherein user selection of individual messages for pausing and transmit rate may change.

In one embodiment, a static payload packet is periodically transmitted on the ADN 130, wherein data messages in the payload are repeatedly transmitted on the ADN 130 over a specified period of time. In another embodiment, sequences of static payload packets refers to a sequence of static payload packets that are periodically transmitted on the ADN 130, wherein the data messages in the payloads are repeatedly transmitted on the ADN 130 in a round-robin manner. Sequences of static payload packets may comprise a list of static payloads that are transmitted in a round robin sequence, wherein a packet transmit scheduler transmits the next static payload in the list when the port transmit period has expired. In one implementation, enhancements may include user ability to specify a transmit count before selecting a next payload in the list, wherein a duty cycle on the transmit count may be used to simulate contention caused by high network traffic in a switch.

In one implementation, the user interface component 116 comprises a software based Windows application that facilitates efficient testing and troubleshooting of data networks, such as the ADN 130. The user interface component 116 is adapted to generate and send Ethernet based data packets on the ADN 130 in accordance with end system definitions and parameters provided in one or more end system configuration files. The user interface component 116 facilitates a relatively simple way for timing adjustments and payload content adjustments of the Ethernet based data packets. The user interface component 116 provides the capability to generate multiple end system traffic from a single network interface component. However, more than one network interface component may be utilized for multiple end system traffic. The user interface component 116 provides direct modification of data payloads and provides for scheduled periodic transmission of the data payloads via selected data ports in an efficient and repeatable manner. Further scope and function of the user interface component 116 is described in greater detail herein.

In one embodiment, the storage component 118 comprises one or more memory devices, such as one or more databases, to store and archive data and information. In various implementations, one or more end system configuration modules (XML files) 112 and one or more payload description modules (XML files) 114 may be stored and archived in the storage component 118 for access by a user via the user interface component 116.

In one embodiment, referring to FIG. 1A, the network interface component 120 comprises an Ethernet compatible network interface device. Static payload packets are periodically transmitted on the ADN 130 via the network interface component 120. The network interface component 120 may have a selectable data bus rate of 100BaseTx or 10BaseT depending on the data bus rate configuration of the Ethernet based ADN 130. In one implementation, the network interface component 120 comprises a CONDOR™ compliant network interface card (CNIC), which may be adapted for use with Ethernet based ADNs on aircraft. Condor Engineering, from Santa Barbara, Calif., is one provider of avionics databus solutions. However, it should be appreciated that, in various implementations, the network interface component 120 may comprise a CNIC, a CONDOR™ compliant NIC, or any other generally known standard network interface card (NIC). In various implementations, standard Ethernet NICs may be utilized, with the understanding that standard Ethernet NICs may lack redundancy management, which the CNIC provides.

In another embodiment, referring to FIG. 1B, it should be appreciated that the user network device 110 may comprise any number of network interface components 120A-120N, and the character 'N' merely represents any number. Each of the one or more network interface components 120A-120N comprises an Ethernet compatible network interface device, such as the CNIC, as previously described.

In one embodiment, the processing component 122 comprises a processor, such as, for example, a microprocessor, microcontroller, digital signal processing (DSP) device, or some other generally known processing device configured to execute instructions. In one aspect, processor 122 is configured to process user operational code and instructions, such as, for example, an x86 processor for running operating systems and applications.

In one embodiment, the aircraft data network (ADN) 130 comprises an Ethernet based communication network for avionics systems and devices. The ADN 130 may be configured to have a data bus rate of 100BaseTx or 10BaseT. Ethernet refers to a packet-based computer networking technology for computer networks, such as local area networks (LANs). In general, a computer network comprises a plurality of computers connected together using a communication system for sharing data, information and resources. A local area network (LAN) comprises a computer network covering a small geographic area, such as an airplane.

Avionics generally refers to electronic systems for use on an aircraft including onboard communication networks for transmitting data and information between different avionic devices on an aircraft. In one embodiment, the ADN 130 utilizes the ARINC 664 Specification. As is generally known, the specification provides data networking standards recommended for use in commercial aircraft installations. For example, the ARINC 664 part 7 specification defines computer networking technology for Aircraft Data Networks (ADNs), which is based on the Ethernet communications protocol.

In one embodiment, each of the end systems 140A-140N represents different electronic systems on an aircraft. These electronic systems may include communication systems, navigation systems, flight control systems, entertainment systems, etc. As shown in FIG. 1B, each end system 140A-140N may comprise one or more network interface components 150A-150N, similar to the network interface component 120 of FIG. 1A, including a CNIC, which is adapted for use with Ethernet based ADNs on commercial aircraft. The network interface components 120, 120A-120N, 150A-150N allow the user network device 110 to communicate with each of the end systems 140A-140N via the Ethernet based ADN 130 for transmission of packets thereto. It should be appreciated that the network communication system 100 may comprise any number of end systems 140A-140N, and the character 'N' merely represents any number.

Figure 2A:
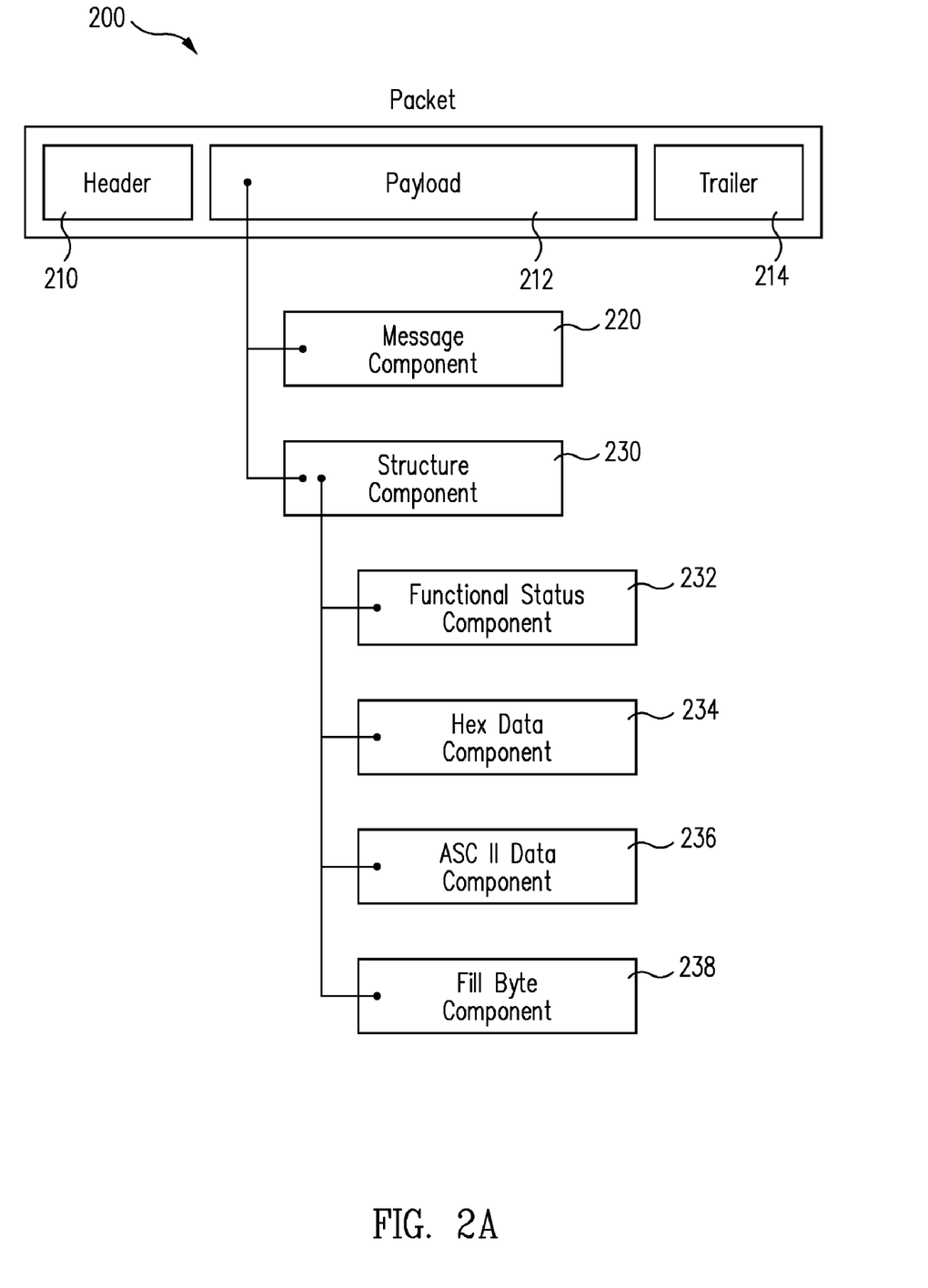
FIG. 2A shows one embodiment of a packet for use in the network communication system of FIG. 1.
Figure 2B:
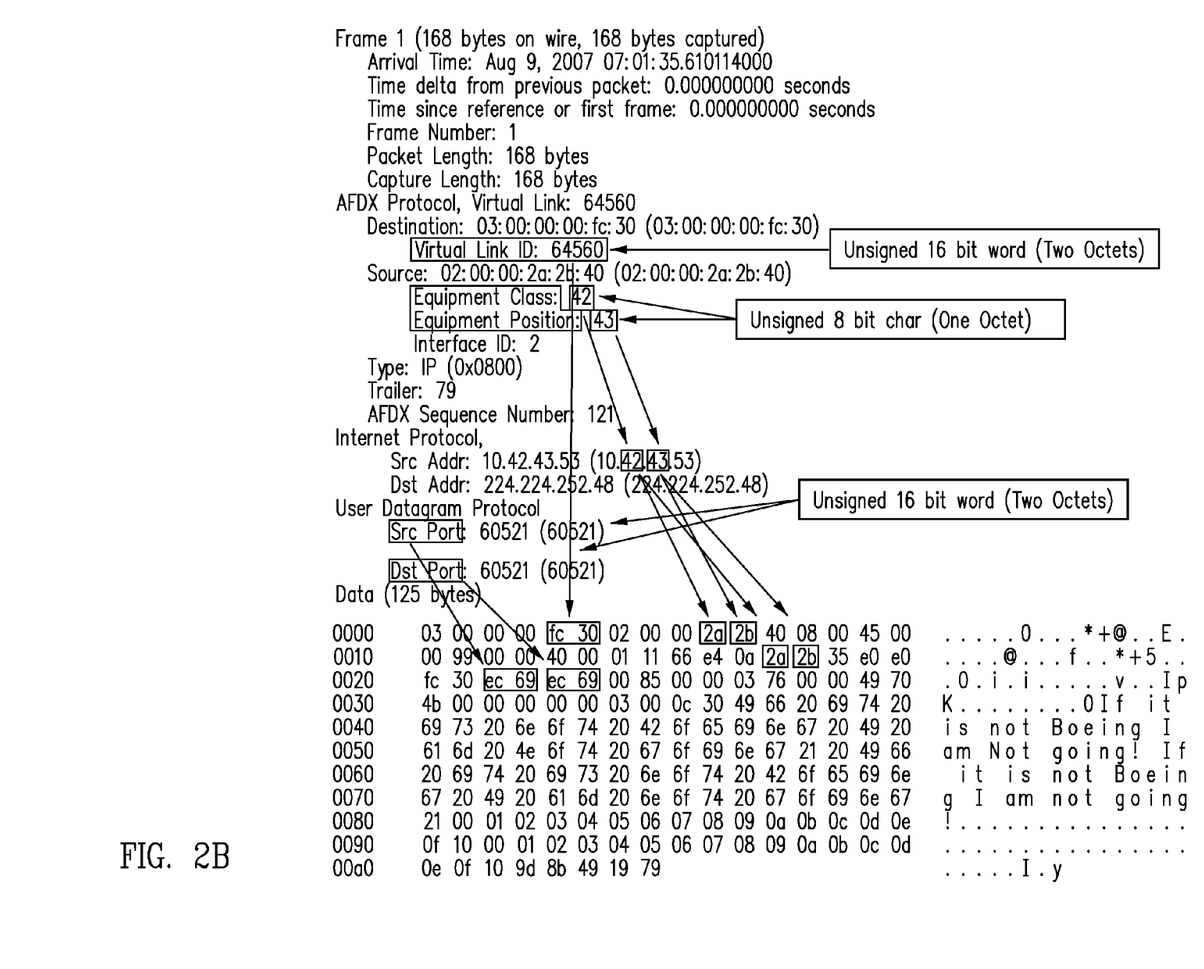
FIG. 2B shows one embodiment of packet data.
Figure 2C:
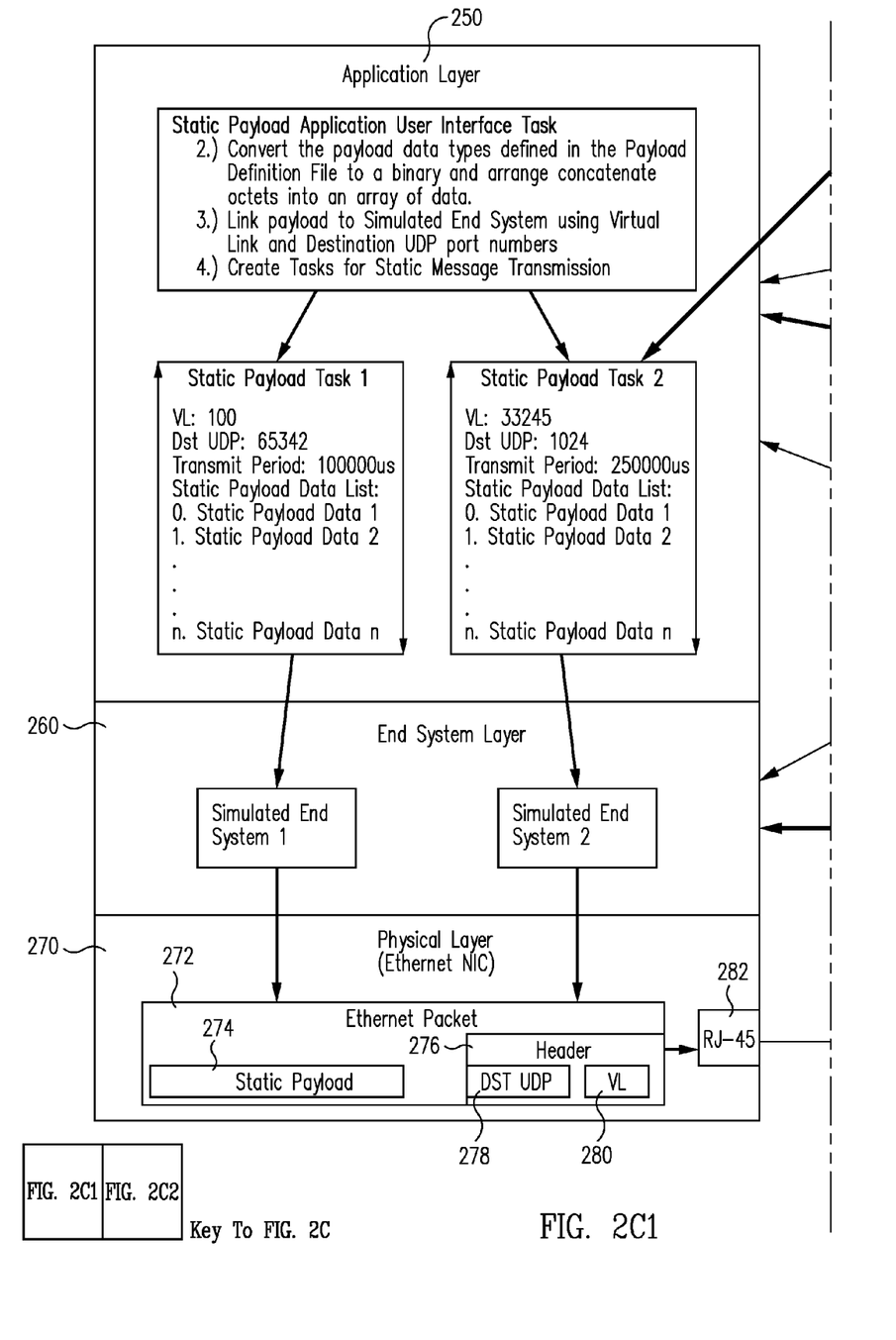
FIG. 2C shows one embodiment of an overview of system layers for generating and transmitting a data packet.
Figure 2C:
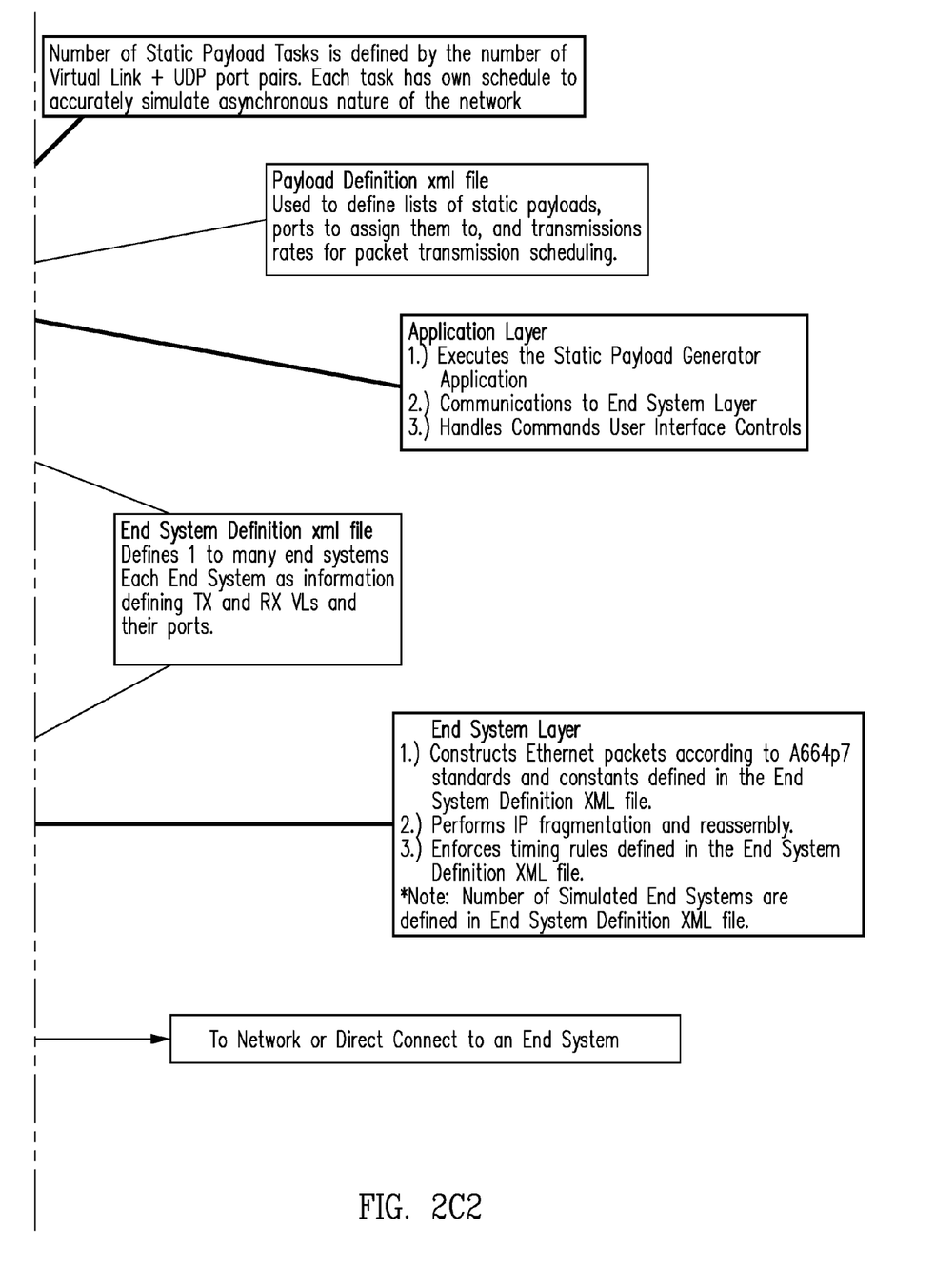

FIG. 2A shows one embodiment of a packet 200 for use in the network communication system 100 of FIG. 1. FIG. 2B shows one embodiment of packet data generated in accordance with embodiments of the present disclosure. In Ethernet technology, data is encoded in a packet according to Ethernet protocol for digital transmission over a computer network. In one implementation, the packet 200 may configured as an ARINC 664 part 7 formatted Ethernet packet, which may also be referred to as an Ethernet frame.

In one embodiment, as shown in FIG. 2A, the data packet 200 comprises a header 210, a payload 212 and a trailer 214. When data is formatted into the packet 200, the network 100 is adapted to transmit longer messages in a more efficient and reliable manner. The header comprises supplemental data placed at the beginning of the packet 200, the trailer 214 comprises supplemental data placed at the end of the packet 200, and the payload 212 comprises data positioned between the header 210 and the trailer 214. The payload 212 carries message data and message structure data. The header 210 and the trailer 214 comprise data related to handling of the packet 200 including the payload 212.

In one embodiment, the payload 212 is defined by the payload description module 114, which may comprise an XML payload description or definition file. The payload 212 may comprise one or more payload definitions including one or more message components 220 and one or more message structure components 230. In one implementation, the XML payload description or definition file may be named CDN_STATIC_PAYLOAD. The payload message definition in the payload description file provides the capability to set transmit intervals between each message transmission. Further detail related to the message component 220 is shown in FIG. 2B, which is described in greater detail herein.

In one embodiment, the message component 220 comprises data and information for transmission on the ADN 130. The message component 220 may include an attribute list having one or more parameters, such as Virtual Link data value (Data type Uint16), DstUDP data (Data type Uint16) and TxPortRate data (Data type Uint32 with units of microseconds). Another parameter may include a usage parameter that is used to bind the message structure component 230 to a transmit port using the Virtual Link and DstLDP data values. The TxPortRate is the period between transmissions of the message structure component 230.

In one embodiment, the message structure component 230 defines the payload 212 with one or more usage parameters including a Functional Status component 232, a Hex Data component 234, an ASCII Data component 236 and a Fill Byte component 238. The message structure component 230 may be assembled in real time by concatenating data values in the components 232, 234, 236, 238. The data may be concatenated in sequence starting with component 232 and ending with component 238 using the Big Endian format of byte order. If more than one instance of the message structure component exists under one payload 212 then each defined message structure component 230 may be iterated through using a round robin schedule each time the particular transmit port's period is transmit eligible.

In one embodiment, the Functional Status component 232 comprises an attribute list having one or more parameters: FS1, FS2, FS3, FS4, wherein data values are specific to ASCII Hex as one byte (e.g., two characters: FS1="E7").

In one embodiment, the Hex Data component 234 comprises an attribute list of a name that is used in the xml file to indicate usage of the data, wherein data values are specified as two hex ASCII characters separated by a colon (e.g., <Hex_Data Name="LengthField-PadField">00:6F:00:00</Hex_Data>). In one implementation, octets may be separated by a colon, wherein one octet may be represented by two hexadecimal characters.

In one embodiment, the ASCII Data component 236 comprises an attribute list of a name that is used in the xml file to indicate usage of the data, wherein data values are specified as printable ASCII characters (e.g., <ASCII_Data Name="A665_LSAP_Fomat">MMMCC-SSSS-SSSS</ASCII_Data>).

In one embodiment, the Fill Byte component 238 comprises an attribute list of a value (two hex characters representing an eight bit byte) and a count (number of instances to concatenate together). The Fill Byte component 238 may specify usage, which is used to fill up payload space without having to specify each byte (i.e., octet) with the actual characters (e.g., <Fill_Byte Value="00" Count="11">).

In one embodiment, the xml payload design may be implemented by the following computer program listing.

```
<?xml version="1.0" encoding="UTF-8"?>
<!-- Xml Schema Created by Timothy E Jackson -->
<xs:schema xmlns:xs="http://www.w3.org/2001/XMLSchema" elementFormDefault="qualified"
attributeFormDefault="unqualified">
    <xs:element name="CDN_STATIC_PAYLOADS">
        <xs:annotation>
            <xs:documentation>Comment describing your root element</xs:documentation>
        </xs:annotation>
        <xs:complexType>
            <xs:sequence maxOccurs="unbounded">
                <xs:element name="Payload">
                    <xs:complexType>
                        <xs:sequence>
                            <xs:element name="Message" maxOccurs="unbounded">
                                <xs:complexType>
                                    <xs:attribute name="VirtualLink" type="xs:unsignedShort" use="required" />
                                    <xs:attribute name="EquipmentClass" type="xs:unsignedByte" use="required" />
                                    <xs:attribute name="EquipmentPosition" type="xs:unsignedByte" use="required" />
                                    <xs:attribute name="SrcUDP" type="xs:unsignedShort" use="required" />
                                    <xs:attribute name="DstUDP" type="xs:unsignedShort" use="required" />
                                </xs:complexType>
                            </xs:element>
                            <xs:element name="MessageStructure" maxOccurs="unbounded">
                                <xs:complexType>
                                    <xs:sequence minOccurs="0" maxOccurs="unbounded">
                                        <xs:element name="FunctionalStatus" minOccurs="0" maxOccurs="unbounded">
                                            <xs:complexType>
                                                <xs:attribute name="FS1" />
                                                <xs:attribute name="FS2" />
                                                <xs:attribute name="FS3" />
                                                <xs:attribute name="FS4" />
                                            </xs:complexType>
                                        </xs:element>
                                        <xs:element name="Fill_Byte" minOccurs="0" maxOccurs="unbounded">
                                            <xs:complexType>
                                                <xs:attribute name="Value" type="xs:unsignedShort" use="required" />
                                                <xs:attribute name="Count" type="xs:unsignedLong" use="required" />
                                            </xs:complexType>
                                        </xs:element>
                                        <xs:element name="ASCII_Data" minOccurs="0" maxOccurs="unbounded" />
                                        <xs:element name="Hex_Data" minOccurs="0" maxOccurs="unbounded" />
                                    </xs:sequence>
                                    <xs:attribute name="Name" />
                                </xs:complexType>
                            </xs:element>
                        </xs:sequence>
                        <xs:attribute name="Name" />
                    </xs:complexType>
                </xs:element>
            </xs:sequence>
        </xs:complexType>
    </xs:element>
</xs:schema>
```

FIG. 2C shows one embodiment of an overview of system layers of system 100 for generating and transmitting a data packet. The systems layers for system 100 may include an application layer 250, an end system layer 260 and a physical layer 270.

In one embodiment, as shown in FIG. 2C, the application layer 250 may be adapted to execute the static payload generator application, communicate with end system layer and handle commands from the user interface controls. In one embodiment, the application layer 250 converts payload data types defined in the payload definition file to binary data and arranges concatenated octets into an array of data, as shown in FIG. 2B. The application layer 250 links payloads to simulated end systems using Virtual Link and Destination UDP port numbers and creates tasks for static message transmission.

In one implementation, a number of static payload tasks may be defined by the number of Virtual Link and UDP port pairs, wherein each task (e.g., static payloads tasks 1 and 2, as shown in FIG. 2C) may have a schedule to more accurately simulate the asynchronous nature of the network. For example, each static payload task may define a Virtual Link (VL), a destination UDP (Dst UDP), a transmit period and a static payload data list having one or more static payload data components (0, 1 . . . N), as shown in FIG. 2C. As discussed herein, the payload definition XML file is used to define lists of static payloads, ports to assign them to, and transmission rates for packet transmission scheduling.

In one embodiment, as shown in FIG. 2C, the end system layer 260 may be adapted to construct Ethernet packets according to ARINC 664 part 7 standards and constants defined in the end system definition XML file, perform IP fragmentation and reassembly and enforce timing rules defined in the end system definition XML file. In one implementation, a number of simulated end systems (e.g., simulated end systems 1 and 2) may be defined in an end system definition XML file. As discussed herein, the end system definition XML file may be adapted to define one to many end systems, wherein each end system includes information defining TX (transmission) and RX (receiver) VLs and their ports.

In one embodiment, as shown in FIG. 2C, the physical layer 270 may be adapted to define the physical Ethernet packet 272 including the static payload component 274 and the header component 276 including the Dst UDP address 278 and the VL address 280 for transmission to the network or direct connect to an end system via network interface component 282.

Figure 3:
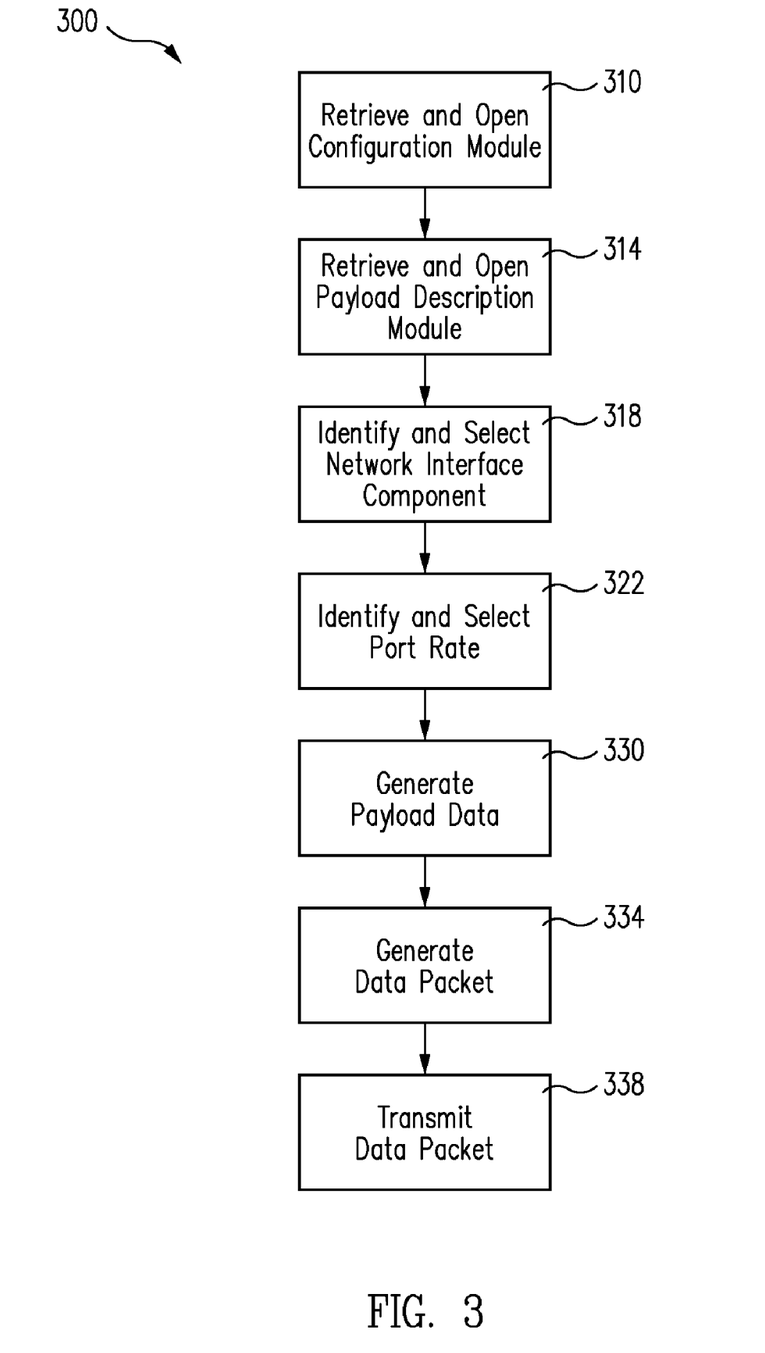
FIG. 3 shows one embodiment of a method for packet generation.

FIG. 3 shows one embodiment of a method 300 for packet generation. In reference to FIG. 1, the user interface component 116 of user network device 110 interacts with the processing component 122, the storage component 118 and the network interface component 120 to perform one or more of the following actions of method 300.

As shown in FIG. 3, the end system configuration module or file 112 is retrieved and opened (block 310). The end system configuration file 112 defines the Ethernet packet. The payload description module or file 114 is retrieved and opened (block 314). The payload description file 114 defines what the data payload is and how to bind it to the data port. The network interface component is identified and selected (block 318). The port rate for the selected network interface component is identified and selected (block 322). The payload module or file is identified, and the payload data is generated (block 330). In one embodiment, payload data is defined in the payload description document, unless the payload defined is smaller than a minimum Ethernet payload size. In that case, it may be padded with zeros in the undefined space. Next, the data packet is generated (block 334). In one embodiment, a data packet is generated if there is a valid link between the end system definition file and the payload definition file, wherein the link between the two files is the VL and UDP pairs. Next, the generated data packet is transmitted (block 338). In a ARINC 664 part 7 compliant network, there may be only one source of a Virtual Link, wherein an end system having a virtual link and UDP pair may become a virtual transmitter of the message. As an option, the generated data packet may be archived by storing the generated data packet in the storage component 118 or some other memory component as described herein.

In one implementation, the network interface component 116 reads in an XML end system configuration file (block 310) that describes how to configure the one or more end systems 140A-140N of network communication system 100 of FIG. 1. In one example, the XML end system configuration file may be implemented by the following computer program listing.

```
<?xml version="1.0" encoding="UTF-8"?>
<!DOCTYPE AFDX_Configuration SYSTEM "BFDXDTD.dtd">
<AFDX_Configuration Name="
  <End_System Name="31.38" Network_ID="31" Equipment_ID="38" Link_Speed="MBPS_100"
End_System_Group_ID="0" Initial_Status="ACTIVE"
Transmission_Table_Scheduling="NOT_ACTIVE">
    <Tx_Virtual_Link Name="VL-33509" Virtual_Link_ID="33509" Bag="32000"
EDE_Enabled="YES" Initial_Status="ACTIVE" Max_Frame_Size="75" Physical_Interface="BOTH"
Skew_Delay_A="0" Skew_Delay_B="0" Skew_Delay_Max="100000"
Transmission_Table_Offset="1100" Transmission_Table_Period="8000">
      <SubVL>
        <Tx_Port Name="" Port_ID="1" Fragmentation_Enabled="NO"
IP_Destination_Address_Format="UNICAST" Access_Type="AFDX"
Unicast_Destination_Address_Byte_2="42" Unicast_Destination_Address_Byte_3="44"
Unicast_Destination_Address_Byte_4="12" Source_Partition="0" Source_Port="60338"
Destination_Port="60338" Periodic="NO" Phase="0" Period="1000000000" Payload_Size="32"
Queue_Depth="1" Initial_Status="ACTIVE" EDE_Source_ID="0" />
      </SubVL>
      <SubVL>
        <Tx_Port Name="" Port_ID="2" Fragmentation_Enabled="NO"
IP_Destination_Address_Format="UNICAST" Access_Type="AFDX"
Unicast_Destination_Address_Byte_2="42" Unicast_Destination_Address_Byte_3="44"
Unicast_Destination_Address_Byte_4="12" Source_Partition="0" Source_Port="60337"
Destination_Port="60337" Periodic="NO" Phase="0" Period="1000000000" Payload_Size="32"
Queue_Depth="1" Initial_Status="ACTIVE" EDE_Source_ID="1" />
```

```
        </SubVL>
      </Tx_Virtual_Link>
    <Tx_Virtual_Link Name="VL-33905" Virtual_Link_ID="33905" Bag="32000"
EDE_Enabled="YES" Initial_Status="ACTIVE" Max_Frame_Size="75" Physical_Interface="BOTH"
Skew_Delay_A="0" Skew_Delay_B="0" Skew_Delay_Max="100000"
Transmission_Table_Offset="1150" Transmission_Table_Period="8000">
        <SubVL>
          <Tx_Port Name="" Port_ID="3" Fragmentation_Enabled="NO"
IP_Destination_Address_Format="UNICAST" Access_Type="AFDX"
Unicast_Destination_Address_Byte_2="42" Unicast_Destination_Address_Byte_3="141"
Unicast_Destination_Address_Byte_4="12" Source_Partition="0" Source_Port="60052"
Destination_Port="60052" Periodic="NO" Phase="0" Period="1000000000" Payload_Size="32"
Queue_Depth="1" Initial_Status="ACTIVE" EDE_Source_ID="3" />
        </SubVL>
        <SubVL>
          <Tx_Port Name="" Port_ID="4" Fragmentation_Enabled="NO"
IP_Destination_Address_Format="UNICAST" Access_Type="AFDX"
Unicast_Destination_Address_Byte_2="42" Unicast_Destination_Address_Byte_3="141"
Unicast_Destination_Address_Byte_4="12" Source_Partition="0" Source_Port="60048"
Destination_Port="60048" Periodic="NO" Phase="0" Period="1000000000" Payload_Size="32"
Queue_Depth="1" Initial_Status="ACTIVE" EDE_Source_ID="4" />
        </SubVL>
      </Tx_Virtual_Link>
    <Rx_Virtual_Link Name="VL-64631" Virtual_Link_ID="64631" MTU="339"
Interface_A_Enable="YES" Interface_B_Enable="YES" IC_Enabled="YES" RM_Enabled="YES"
Skew_Max="10000" Prev_Seq_Number_Range="10" EDE_Enabled="YES"
EDE_Subscriber_ID="43" EDE_Skew_Max="8192" EDE_Age_Max="8192"
EDE_Max_Time_Lag="8192" Rx_VL_ICMP_Enabled="NO">
      <Rx_Port Name="" Port_ID="168" Physical_Interface="ADAPTER_A"
Destination_UDP_Port_Number="59116" Destination_Partition="256"
Sampling_or_Queuing="QUEUING" Queue_Depth="10" EDE_Source_ID="69907"
EDE_Age_Validation_Enabled="NO" />
    </Rx_Virtual_Link>
  </End_System>
```

In one implementation, after the end system configuration file is read and configures the runtime environment of the user interface component 116, the next file to be read in is the xml payload description file (block 314), which may be implemented by the following computer program listing.

```
<?xml version="1.0" encoding="UTF-8"?>
<CDN_STATIC_PAYLOADS>
  <Payload Name="My Static Payload">
    <Message VirtualLink="64557" DstUDP="60551"
TxPortRate="1000000" />
    <Message VirtualLink="64560" DstUDP="60521"
TxPortRate="1000000" />
    <Message VirtualLink="32899" DstUDP="60467"
TxPortRate="1000000" />
    <Message VirtualLink="64568" DstUDP="61038"
TxPortRate="1000000" />
    <MessageStructure Name="Msg# 1">
      <Hex_Data Name="Reseved Word">00:00:00:00</Hex_Data>
      <FunctionalStatus FS1="03" FS2="00" FS3="0C" FS4="30"/>
      <ASCII_Data Name="Single Line ASCII">If it is not Boeing
       I am Not going! </ASCII_Data>
      <ASCII_Data Name="Some ASCII DATA 1">If </ASCII_Data>
      <ASCII_Data Name="Some ASCII DATA 2">it </ASCII_Data>
      <ASCII_Data Name="Some ASCII DATA 3">is </ASCII_Data>
      <ASCII_Data Name="Some ASCII DATA 4">not </ASCII_Data>
      <ASCII_Data Name="Some
       ASCII DATA 5">Boeing </ASCII_Data>
      <ASCII_Data Name="Some ASCII DATA 6">I </ASCII_Data>
      <ASCII_Data Name="Some ASCII DATA 7">am </ASCII_Data>
      <ASCII_Data Name="Some ASCII DATA 8">not </ASCII_Data>
      <ASCII_Data Name="Some ASCII DATA 9">going!</ASCII_Data>
      <Hex_Data Name="17 bytes of
data">00:01:02:03:04:05:06:07:08:09:0A:0B:0C:0D:0E:0F:10
</Hex_Data>
      <Hex_Data Name="">00</Hex_Data>
      <Hex_Data Name="">01</Hex_Data>
      <Hex_Data Name="">02</Hex_Data>
      <Hex_Data Name="">03</Hex_Data>
      <Hex_Data Name="">04</Hex_Data>
      <Hex_Data Name="">05</Hex_Data>
      <Hex_Data Name="">06</Hex_Data>
      <Hex_Data Name="">07</Hex_Data>
      <Hex_Data Name="">08</Hex_Data>
      <Hex_Data Name="">09</Hex_Data>
      <Hex_Data Name="">0A</Hex_Data>
      <Hex_Data Name="">0B</Hex_Data>
      <Hex_Data Name="">0C</Hex_Data>
      <Hex_Data Name="">0D</Hex_Data>
      <Hex_Data Name="">0E</Hex_Data>
      <Hex_Data Name="">0F</Hex_Data>
      <Hex_Data Name="">10</Hex_Data>
    </MessageStructure>
  </Payload>
</CDN_STATIC_PAYLOADS>
```

In one implementation, the above described end system configuration file uses the Virtual Link ID and Destination UDP to bind the payload to the transmit virtual link communications (corn) port, wherein a corn port is a numeric handle that the end system API gives to the VL/UDP pair. In one example, each time the TxPortRate period expires, a scheduler for the payload generator transmits the message structure again. The periodic message runs until the user stops the scheduler.

In the above example, the message may be concatenated together starting at a first element of the message structure on top and working to the bottom. The above example may become an array of octets, as follows, with further explanation provided in FIG. 2B.

00:00:00:00:03:00:0c:30:49:66:20:69:74:20:69:73:20:6e:
6f:74:20:42:6f: 65:69:6e:67:20:49:20:61:6d:20:4e:6f:
74:20:67:6f:69:6e:67:21:49:66:20:69:74:20:69:73:20:
6e:6f:74:20:42:6f:65:69:6e:67:20:49:20:61:6d:20:6e:

6f:74:20:67:6f:69:6e:67:21:00:01:02:03:04:05:06:07:
08:09:0a:0b:0c:0d: 0e:0f:10:00:01:02:03:04:05:06:07:
08:09:0a:0b:0c:0d:0e:0f:10

In one implementation, in addition to a single message, when more than one message structure element is included as an element to the payload, the scheduler for the payload generator may transmit each message structure element in a 'round robin' sequence. For example, the scheduler may transmit each message starting at a first element at the top working down each time the transmit rate period has expired. This may be implemented with the following computer program listing.

```
<Payload Name="Config Manifest">
  <Message VirtualLink="64557" DstUDP="60551"
  TxPortRate="1000000" />
    <MessageStructure Name="Payload_1">
      <ASCII_Data Name="Single Line ASCII">Fly</ASCII_Data>
    </MessageStructure>
    <MessageStructure Name="Payload_2">
      <ASCII_Data Name="Single Line ASCII">Boeing</ASCII_Data>
    </MessageStructure>
    <MessageStructure Name="Payload_3">
      <ASCII_Data Name="Single Line ASCII">787</ASCII_Data>
    </MessageStructure>
</Payload>
```

In one example, the above program listing for the payload generator may perform the following.
1. Format a packet.
2. Create three individual payloads (Payload 1, Payload 2, Payload 3).
3. Transmit the packets in sequence when the TxPortRate period expires (every 1000000 us for this example).
4. Resulting payload over the network (assuming no jitter):

| Packet Number | Time | Message Payload |
| --- | --- | --- |
| 1 | 1000000 us | Payload 1 |
| 2 | 2000000 us | Payload 2 |
| 3 | 3000000 us | Payload 3 |
| 4 | 4000000 us | Payload 1 |
| 5 | 5000000 us | Payload 2 |
| 6 | 6000000 us | Payload 3 |
| 7 | 7000000 us | Payload 1 |
| 8 | 8000000 us | Payload 2 |
| 9 | 9000000 us | Payload 3 |

Figure 4A:
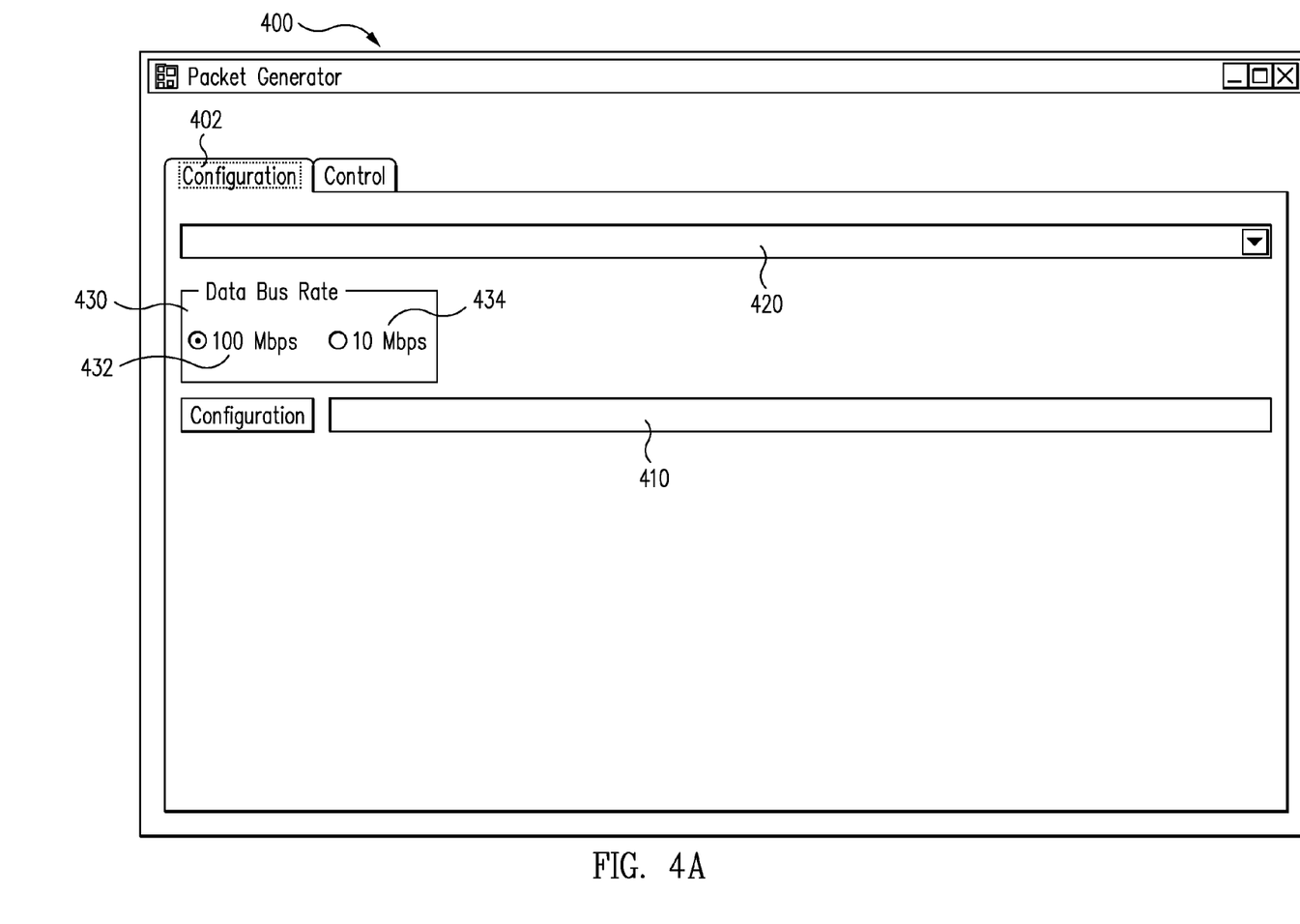
FIGS. 4A-4B show various embodiments of a user interface component implemented as a graphical user interface (GUI).
Figure 4B:
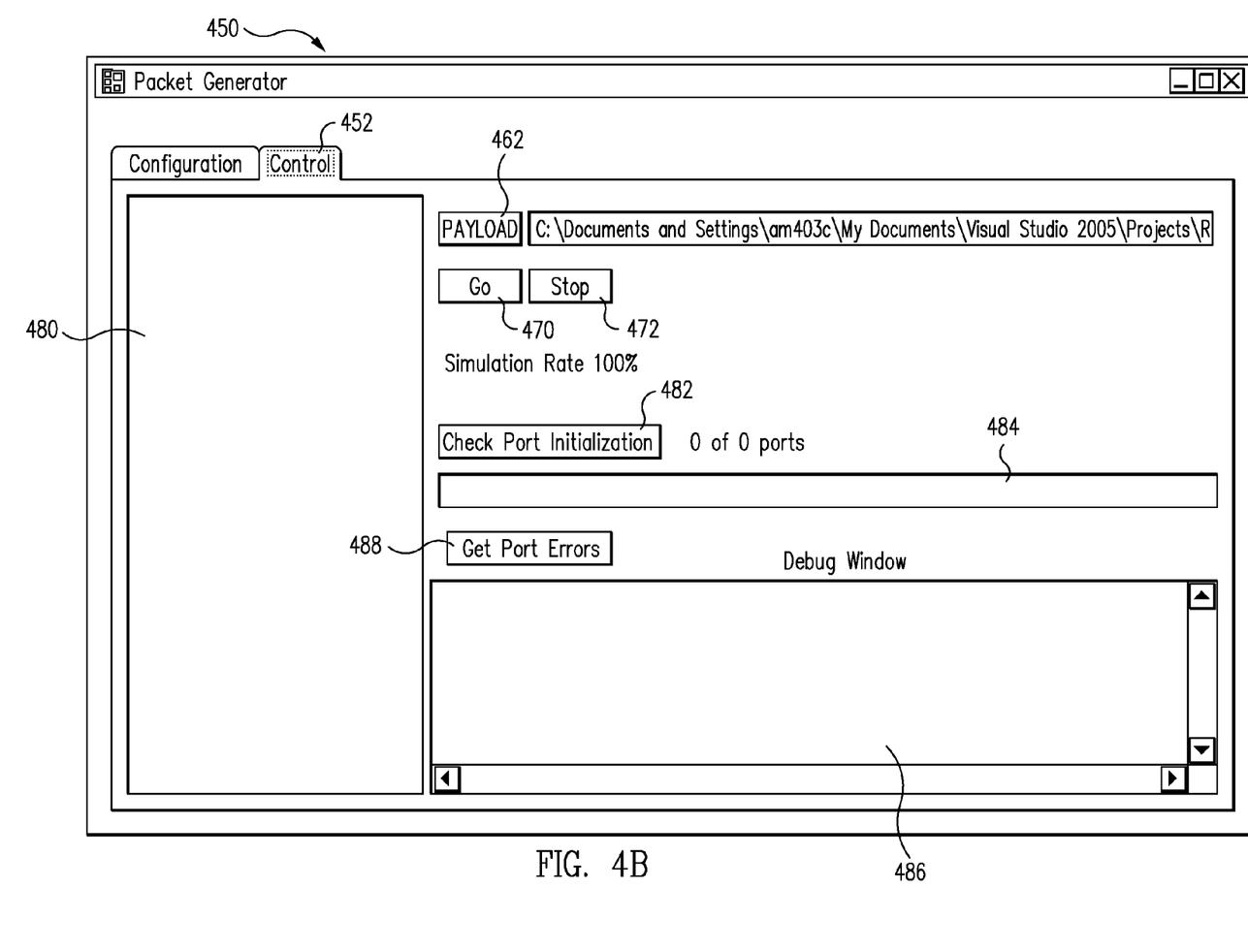

FIGS. 4A and 4B show embodiments of the user interface component 116 implemented as a graphical user interface (GUI) having a first window 400 for user configuration upon selecting a configuration tab 402 and a second window 450 for user control upon selecting a control tab 452, as will be described in conjunction with FIG. 3.

Referring to FIG. 4A, the user interface component 116 provides a box 410 for a user to identify the end system configuration module (file) 112. In one example, a button 412 allows a user to browse one or more configuration files stored in the storage component 118 and select the desired end system configuration file 112 to retrieve and open.

As shown in FIG. 4A, the user interface component 116 provides a box 420 for a user to identify the network interface component 120. In one example, the box 420 allows a user to browse a listing of one or more available network interface components and select the desired network interface component 120 for packet transmission.

As shown in FIG. 4A, the user interface component 116 provides a box 430 for a user to identify the data bus port rate for the network interface component 120. In one example, the box 430 allows a user to select between a first data bus port rate button 432, such as 100 Mbps for 100BaseTx, and a second data bus port rate button 434, such as 10 Mbps for 10BaseT.

Referring to FIG. 4B, the user interface component 116 provides a box 460 for a user to identify the payload description module (file) 114. In one example, a button 462 allows a user to browse one or more payload description files stored in the storage component 118 and select the desired payload description file 112 to retrieve and open.

As shown in FIG. 4B, the user interface component 116 provides a start button 470 to initiate packet generation and a stop button 472 to stop packet generation. In one example, once the parameters for packet generation are set in boxes 410, 420, 430, 460, a user may start packet generation by selecting start button 470. If the user decides to stop packet generation, the user may select stop button 472 for this purpose.

As shown in FIG. 4B, the user interface component 116 may be adapted to provide a port tree view box 480, which is adapted to display one or more files related to the payload description file when opened. In one embodiment, when the "Check Port Initialization" button 488 is pressed the tree view populates and display the initialization status of the task that is assigned to transmit a particular message.

As shown in FIG. 4B, the user interface component 116 may be adapted to provide a check port initialization button 484 to verify that the port for the network interface component 120 selected in box 420 of FIG. 4A is initialized and available. A progress box 484 shows the status of checking port initialization. In one implementation, each port takes approximately one second to initialize. In a relatively large configuration, a static packet generator may have approximately 600 to 800 individual VL/UDP pairs, which may take a large amount of time, such as about 10 minutes, for a large configuration to become fully initialized.

As shown in FIG. 4B, the user interface component 116 may be adapted to provide a debug box 486, which is adapted to display one or more errors related to the port for the network interface component 120 selected in box 420 of FIG. 4A. A button 488 allows a user to select this feature.

Figure 5:
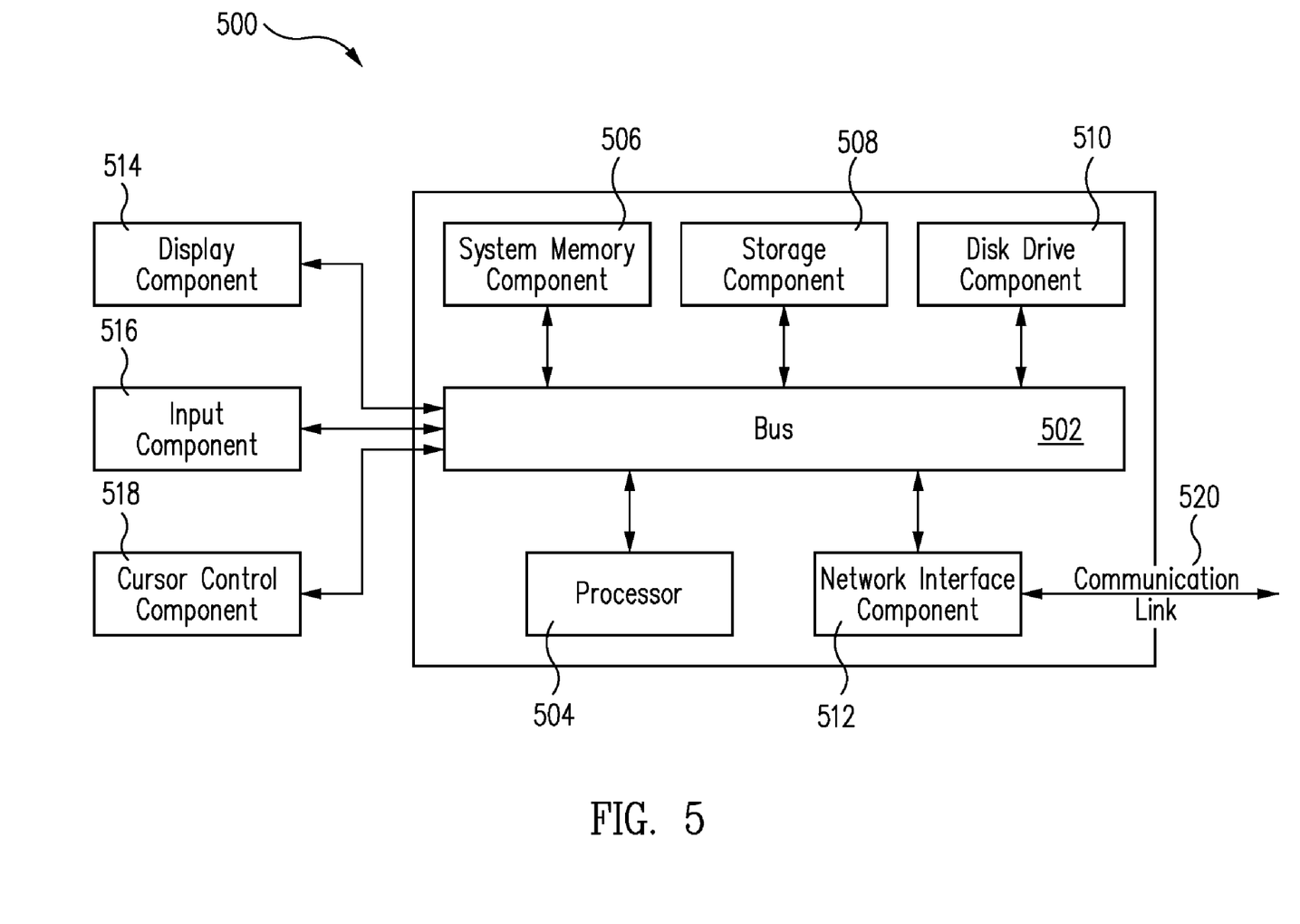
FIG. 5 shows a computer system suitable for implementing embodiments of the present disclosure.

FIG. 5 is a block diagram of a computer system 500 suitable for implementing embodiments of the invention. Computer system 500 includes a bus 502 or other communication mechanism for communicating information, which interconnects subsystems and components, such as processor 504 (e.g., the processing component 122 discussed herein in reference to FIG. 1), system memory component 506 (e.g., RAM), static storage component 508 (e.g., ROM, such as the storage component 118 discussed herein in reference to FIG. 1), disk drive component 510 (e.g., magnetic or optical), network interface component 512 (e.g., modem or Ethernet card, such as the network interface component 120 discussed herein in reference to FIG. 1), display component 514 (e.g., CRT or LCD), input component 516 (e.g., keyboard), and cursor control component 518 (e.g., mouse or trackball).

In accordance with embodiments of the invention, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement the invention.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other permanent or removable magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the invention, execution of instruction sequences to practice the invention may be performed by computer system 500. In various other embodiments of the invention, a plurality of computer systems 500 coupled by communication link 520 (e.g., ADN 130 of FIG. 1, LAN, PTSN, or wireless network) may perform instruction sequences to practice the invention in coordination with one another.

Computer system 500 may transmit and receive messages, data, information and instructions, including one or more programs (i.e., application code) through communication link 520 and network interface component 512. Received program code may be executed by processor 504 as received and/or stored in disk drive component 510 or some other non-volatile storage component for execution.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into sub-components having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described herein illustrate but do not limit the invention. It should also be understood that numerous modifications and variations are possible in accordance with the principles of the present invention. Accordingly, the scope of the invention is defined only by the following claims.

I claim:

1. A device for simulating a source endpoint for an Aeronautical Radio, Inc (ARINC) 664 aircraft data network having a plurality of end systems, the device comprising:
   a configuration module;
   a payload description module;
   a storage component adapted to store the configuration module and the payload description module;
   a processor adapted to execute instructions;
   a plurality of network interface components adapted to communicate with network interface components of corresponding end systems via the aircraft data network; and
   a user interface component adapted to interact with the processor to:
      retrieve the configuration module and the payload description module from the storage component;
      select one or more network interface components to communicate with one or more corresponding end systems;
      generate a data packet for distribution to the corresponding end systems by executing instructions from the configuration module to define ARINC 664 configurations selected from the group consisting of equipment class, transmit port, receive port, time manager subscriber data, and error detection encoding data for the corresponding end groups and by executing instructions from the payload description module to define an ARINC 664 payload such that the data packet is distributed according to a transmit interval determined by the payload description module instructions; and
      communicate with the selected network interface components to transmit the generated data packet to the network interface components of the corresponding end systems via the aircraft data network.

2. The device of claim 1, wherein the configuration module comprises an eXtensible Markup Language (XML) based configuration file, and wherein the payload description module comprises an XML based payload description file.

3. The device of claim 1, the user interface component further adapted to interact with the processor to select a port rate for the selected network interface components.

4. The device of claim 1, wherein the storage component comprises computer memory adapted to store software encoded in one or more computer readable media.

5. The device of claim 1, wherein the network interface component comprises a CONDOR compliant network interface card (CNIC) adapted for use with the aircraft data network to communicate with each of the plurality of end systems.

6. The device of claim 1, wherein the aircraft data network comprises an Ethernet based aircraft data network for commercial aircraft.

7. The device of claim 1, wherein the user interface component comprises a software application in the form of a graphical user interface (GUI) adapted to interact with a user.

8. The device of claim 1, wherein the data packet comprises data message content in a payload portion of the data packet.

9. The device of claim 1, wherein the data packet comprises a static payload packet that is repeatedly transmitted on the aircraft data network over a specified period of time.

10. The device of claim 9, wherein the static payload packet comprises a sequence of one or more static payload packets that are repeatedly transmitted to each of the plurality of end systems in a round-robin manner.

11. The device of claim 1, further comprising a user input device adapted to allow a user to provide input to the user interface component, and further comprising a user display device adapted to allow a user to view the user interface component and the input provided thereto.

12. A method for distributing data packets from a simulated Aeronautical Radio, Inc (ARINC) 664 endpoint on an ARINC 664 aircraft data network, the method comprising:

defining an ARINC 664 configuration selected from the group consisting of equipment class, transmit port, receive port, time manager subscriber data, and error detection encoding data for one or more corresponding end groups;

defining an ARINC 664 payload definition;

selecting one or more network interface components to communicate with one or more corresponding end systems;

selecting a port rate for the selected network interface components;

generating payload data and a data packet from the generated payload data based upon the defined ARINC 664 configuration and payload definition; and transmitting the generated data packet from the selected network interface components to the corresponding end systems via the aircraft data network according to a transmit interval determined by the payload definition.

13. The method of claim 12, wherein the configuration module comprises an XML based configuration file, and wherein the payload description module comprises an XML based payload description file.

14. The method of claim 12, wherein the aircraft data network comprises an Ethernet based aircraft data network for commercial aircraft.

15. The method of claim 12, wherein the data packet comprises a static payload packet that is repeatedly transmitted on the aircraft data network over a specified period of time.

16. The method of claim 15, wherein the static payload packet comprises a sequence of one or more static payload packets that are repeatedly transmitted to each of the plurality of end systems in a round-robin manner.

* * * * *